United States Patent
Suyama et al.

(10) Patent No.: US 11,079,344 B2
(45) Date of Patent: Aug. 3, 2021

(54) RADIATION DETECTION DEVICE, RADIATION IMAGE ACQUISITION DEVICE, AND RADIATION IMAGE ACQUISITION METHOD

(71) Applicant: HAMAMATSU PHOTONICS K.K., Hamamatsu (JP)

(72) Inventors: Toshiyasu Suyama, Hamamatsu (JP); Tatsuya Onishi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 141 days.

(21) Appl. No.: 16/348,591

(22) PCT Filed: Nov. 16, 2017

(86) PCT No.: PCT/JP2017/041255
§ 371 (c)(1),
(2) Date: May 9, 2019

(87) PCT Pub. No.: WO2018/097023
PCT Pub. Date: May 31, 2018

(65) Prior Publication Data
US 2020/0057008 A1 Feb. 20, 2020

(30) Foreign Application Priority Data

Nov. 25, 2016 (JP) .............................. JP2016-229359

(51) Int. Cl.
*G01N 23/18* (2018.01)
*G01N 23/04* (2018.01)
(Continued)

(52) U.S. Cl.
CPC .............. *G01N 23/18* (2013.01); *G01N 23/04* (2013.01); *G01N 23/087* (2013.01); *G01T 1/20* (2013.01);
(Continued)

(58) Field of Classification Search
CPC ...... G01N 23/18; G01N 23/04; G01N 23/087; G01N 2223/652; G01N 2223/424; G01N 2223/505; G01N 2223/643; G01T 1/20
See application file for complete search history.

(56) References Cited

U.S. PATENT DOCUMENTS

| 7,453,980 B1 | 11/2008 | Gilevich et al. |
| 2012/0145910 A1* | 6/2012 | Suyama ................. G01V 5/005 250/366 |

(Continued)

FOREIGN PATENT DOCUMENTS

| EP | 2479557 A1 | 7/2012 |
| EP | 2778663 A1 | 9/2014 |

(Continued)

OTHER PUBLICATIONS

Machine Translation for WO 2013/069353 A1 (2013). (Year: 2013).*
International Preliminary Report on Patentability dated Jun. 6, 2019 for PCT/JP2017/041255.

*Primary Examiner* — Chih-Cheng Kao
(74) *Attorney, Agent, or Firm* — Faegre Drinker Biddle & Reath LLP

(57) ABSTRACT

An X-ray detection device 30 comprises a low energy scintillator 31 configured to convert an X-ray of a low energy range into scintillation light, a low energy line sensor 32 configured to detect the scintillation light to output image data, a high energy scintillator 33 configured to convert an X-ray of a high energy range into scintillation light, and a high energy line sensor 34 configured to detect the scintillation light to output image data. Pixels L of the low energy line sensor 32 and pixels H of the high energy line sensor 34 are identical in number and are aligned at an identical pixel pitch, and a minimum filtering process is executed on the image data from the low energy line sensor 32, while an averaging process is executed on the image data from the high energy line sensor 34.

10 Claims, 6 Drawing Sheets

(51) Int. Cl.
*G01N 23/087* (2018.01)
*G01T 1/20* (2006.01)
(52) U.S. Cl.
CPC .............. *G01N 2223/424* (2013.01); *G01N 2223/505* (2013.01); *G01N 2223/643* (2013.01); *G01N 2223/652* (2013.01)

(56) References Cited

U.S. PATENT DOCUMENTS

| | | | | |
|---|---|---|---|---|
| 2012/0145911 A1* | 6/2012 | Suyama | ................ | G01V 5/005 250/366 |
| 2012/0148024 A1* | 6/2012 | Suyama | ................ | G01N 23/04 378/62 |

FOREIGN PATENT DOCUMENTS

| | | |
|---|---|---|
| JP | S60-200189 A | 10/1985 |
| JP | 2000-510729 A | 8/2000 |
| JP | 2002-216106 A | 8/2002 |
| JP | 2005-172510 A | 6/2005 |
| JP | 2010-117172 A | 5/2010 |
| JP | 2011-64642 A | 3/2011 |
| JP | 2011-64643 A | 3/2011 |
| WO | WO-97/42877 A1 | 11/1997 |
| WO | WO 2013/069353 A1 | 5/2013 |
| WO | WO-2016/143401 A1 | 9/2016 |

\* cited by examiner

RADIATION DETECTION DEVICE, RADIATION IMAGE ACQUISITION DEVICE, AND RADIATION IMAGE ACQUISITION METHOD

TECHNICAL FIELD

The present invention relates to a dual energy type radiation detection device, a radiation image acquisition device comprising the radiation detection device, and a radiation image acquisition method, and more particularly to a dual energy type radiation detection device in which numbers of pixels of respective line sensors constituting the radiation detection device are the same and pixel intervals at which the pixels are arranged are the same, a radiation image acquisition device comprising the radiation detection device, and a radiation image acquisition method.

BACKGROUND ART

Patent Literatures 1 and 2 disclose a radiation detection device configured to execute a detection of foreign matters, a measurement of a constituent distribution, or a measurement of weight in an in-line non-destructive inspection of detection target objects conveyed by a belt conveyor. This radiation detection device comprises a radiation detector having scintillators and line sensors and generates a radiation image by detecting a radiation that is transmitted through the detection target object. This radiation detection device is a dual energy type radiation detection device, in which a pixel area for detecting a low energy range is reduced to thereby increase a contrast difference in a radiation image and which adopts a configuration in which the line sensor for detecting a low energy range and the line sensor for detecting a high energy range are different in number of pixels and pixel pitch at which the pixels are arranged. Patent Literature 3 discloses a dual energy type radiation detection device which is a radiation detector suitable for a CT scanner or the like and in which numbers of pixels and pixel pitches are the same.

CITATION LIST

Patent Literature

Patent Literature 1: Japanese Unexamined Patent Publication No. 2011-064642
Patent Literature 2: Japanese Unexamined Patent Publication No. 2011-064643
Patent Literature 3: Japanese Unexamined Patent Publication No. S60-200189

SUMMARY OF INVENTION

Technical Problem

In the dual energy type radiation detection device, a real time process is desired when foreign matters are checked by acquiring a radiation image of a target object particularly in an in-line non-destructive inspection, although not limited thereto. Due to this, in the case where the numbers of pixels of the line sensors constituting the radiation detection device are great, there is caused a problem in that the real time process cannot catch up with a required speed. On the other hand, when image data acquired by the pixels of each of the line sensors is simply thinned out, the contrast difference in the detection target object is reduced, that is, the information on foreign matters is removed, as a result of which there are fears that a proper radiation image cannot be acquired.

According to an aspect of an embodiment, an object of the embodiment is to provide a radiation detection device, a radiation image acquisition device, and a radiation image acquisition method, which can acquire a proper radiation image and enable a real time process.

Solution to Problem

An embodiment of the present invention relates, as an aspect thereof, to a radiation detection device for detecting a radiation transmitted through a target object conveyed in a conveyance direction. This radiation detection device comprises a first scintillator configured to convert a radiation of a low energy range in the radiation transmitted through the target object into first scintillation light, a first line sensor having a plurality of first pixels arranged along a detection direction intersecting the conveyance direction and configured to detect the first scintillation light with the first pixels to output first image data, a second scintillator configured to convert a radiation of a high energy range in the radiation transmitted through the target object into second scintillation light, the high energy range being higher than the low energy range, a second line sensor having a plurality of second pixels arranged along the detection direction intersecting the conveyance direction and configured to detect the second scintillation light with the second pixels to output second image data. The first pixels of the first line sensor and the second pixels of the second line sensor are identical to each other in number and are arranged at an identical pixel pitch. A first thinning-out process including a minimum filtering process is executed on the first image data outputted from the first line sensor, and a second thinning-out process including an averaging process or an adding process is executed on the second image data outputted from the second line sensor.

In this radiation detection device, the first thinning-out process including the minimum filtering process is executed on the first image data outputted from the first line sensor that detects the radiation of the low energy range, whereas the second thinning-out process including the averaging process or the adding process is executed on the second image data outputted from the second line sensor that detects the radiation of the high energy range. In this case, the minimum process is executed on the image from the first line sensor to acquire the radiation image of the low energy range in which a difference in luminance between foreign matters and a background is relatively great to reduce the number of pixels to a half, and the low luminance data is left, whereby the information on foreign matters can be left in image data resulting after the thinning-out process. On the other hand, the averaging process or the adding process is executed on the image from the second line sensor to acquire the radiation image of the high energy range in which the difference in luminance between foreign matters and the background is relatively small not only to reduce noise (improve S/N) but also to reduce the number of pixels to a half while preventing the information on foreign matters from being removed from image data resulting after the thinning-out process. Thus, according to this radiation detection device, the real time process can be achieved by lowering the resolution of the radiation image which is acquired while leaving the information on foreign matters. When referred to herein, the "minimum filtering process" is a thinning-out process in which of signals from adjacent pixels, image data having a lower luminance is left and the remaining image data is removed. The "averaging process" is a thinning-out process in which an average value of luminances of signals from adjacent pixels is calculated to reduce the quantity of data, and the "adding process" is a thinning-out process in which luminances of signals from adjacent pixels are added to reduce the quantity of data and is substantially a similar process to the averaging process.

The radiation detection device described above may further comprise an image processing unit configured to execute a first thinning-out process including a minimum filtering process on the first image data outputted from the first line sensor and to execute a second thinning-out process including an averaging process or an adding process on the second image data outputted from the second line sensor.

In the radiation detection device described above, the image processing unit may be able to switch between the first thinning-out process including the minimum filtering process and the second thinning-out process including the averaging process or the adding process. In this case, the predetermined thinning-out processes can be executed sequentially on the image data outputted from the first line sensor and the image data outputted from the second line sensor, whereby the real time process can be executed in a more ensured fashion.

In the radiation detection device described above, the second scintillator may be disposed to convert a radiation transmitted through the first scintillator into the second scintillation light. In this case, since the first and second scintillators are disposed sequentially relative to an incident direction of the radiation (disposed, for example, in such a way as to be superposed on each other vertically), the same position on the target object can be imaged without performing a delay control of detection timing at which the radiation is detected by both the scintillators.

In the radiation detection device described above, the first and second line sensors may be disposed parallel to each other with a predetermined area defined between them. In this case, since the distances between the first and second line sensors and the radiation source that radiates a radiation to the target object become the same, the same position on the target object can be imaged without performing a control taking a magnification rate of the radiation from the radiation source or the like into consideration.

An embodiment of the present invention relates, as another aspect thereof, to a radiation image acquisition device comprising a radiation detection device comprising any one of the configurations described above. This radiation image acquisition device comprises a radiation source configured to emit a radiation to a target object, a conveyance unit configured to convey the target object in a conveyance direction, any one of the radiation detection devices described above, and an image forming device configured to form a radiation image based on first converted image data on which a minimum process is executed and second converted image data on which an averaging process or an adding process is executed. In this case, too, as described above, the real time process can be achieved by lowering the resolution of the proper radiation image which is acquired while leaving the information on foreign matters.

An embodiment of the present invention relates, as a further aspect thereof, to a radiation image acquisition method for detecting a radiation transmitted through a target object conveyed in a conveyance direction using a radiation detection device. The radiation detection device comprises a first scintillator, a second scintillator, a first line sensor having a plurality of first pixels arranged along a detection direction, a second line sensor having a plurality of second pixels arranged along the detection direction, and an image processing unit. The first pixels and the second pixels are identical to each other in number and are arranged at an identical pixel pitch. This radiation image acquisition method comprises a first conversion step of converting a radiation of a low energy range in the radiation transmitted through the target object into first scintillation light by the first scintillator, a first detection step of detecting the first scintillation light with the first pixels of the first line sensor to output first image data, a second conversion step of converting a radiation of a high energy range which is higher than the low energy range in the radiation transmitted through the target object into a second scintillation light by the second scintillator, a second detection step of detecting the second scintillation light with the second pixels of the second line sensor to output second image data, a first image processing step of executing a first thinning-out process which is a minimum filtering process on the first image data using the image processing unit to output a first converted image, and a second image processing step of executing a second thinning-out process which is an averaging process or an adding process on the second image data using the image processing unit to output a second converted image.

This radiation image acquisition method comprises the first image processing step of executing the first thinning-out process which is the minimum filtering process on the first image data to output the first converted image and the second image processing step of executing the second thinning-out process which is the averaging process or the adding process on the second image data to output the second converted image. In this case, as described above, the minimum process is executed on the first image from the first line sensor to acquire the radiation image of the low energy range in which a difference in luminance between foreign matters and a background is relatively great to reduce the number of pixels to a half, and the low luminance data is left, whereby the information on foreign matters can be left in image data resulting after the thinning-out process. On the other hand, the averaging process or the adding process is executed on the second image from the second line sensor to acquire the radiation image of the high energy range in which the difference in luminance between foreign matters and the background is relatively small not only to reduce noise (improve S/N) but also to reduce the number of pixels to a half while preventing the information on foreign matters from being removed from image data resulting after the thinning-out process. Thus, according to this radiation detection device, the real time process can be achieved by lowering the resolution of the radiation image which is acquired while leaving the information on foreign matters.

In the radiation image acquisition method described above, in the second conversion step, the radiation transmitted through the first scintillator may be converted into the second scintillation light by the second scintillator. In this case, since the first and second scintillators are disposed sequentially relative to the incident direction of the radiation (disposed, for example, in such a way as to be superposed on each other vertically), the same position on the target object can be imaged without performing the delay control of detection timing at which the radiation is detected by both the scintillators.

In the radiation image acquisition method described above, the first and second detection steps may be executed by the first and second line sensors which are arranged parallel to each other with a predetermined area defined between them. In this case, since the distances between the first and second line sensors and the radiation source that radiates a radiation to the target object become the same, the same position on the target object can be imaged without performing a control taking a magnification rate of the radiation from the radiation source or the like into consideration.

The radiation image acquisition method described above may further comprise an emitting step of emitting a radiation to the target object, a conveyance step of moving the target object along a conveyance direction, and a generation step of generating a radiation image based on the first converted image and the second converted image. In this case, as described above, the real time process can be achieved by lowering the resolution of the proper radiation image which is acquired while leaving the information on foreign matters.

Advantageous Effects of Invention

According to the radiation detection device, the radiation image acquisition device, and the radiation image acquisition method according to the embodiments, the proper radiation image can be acquired, and the real time process can be enabled.

BRIEF DESCRIPTION OF DRAWINGS

FIG. 3 is a schematic block diagram of an X-ray detection device used in the X-ray foreign matter inspection device illustrated in

FIG. 2.

DESCRIPTION OF EMBODIMENTS

Figure 1:
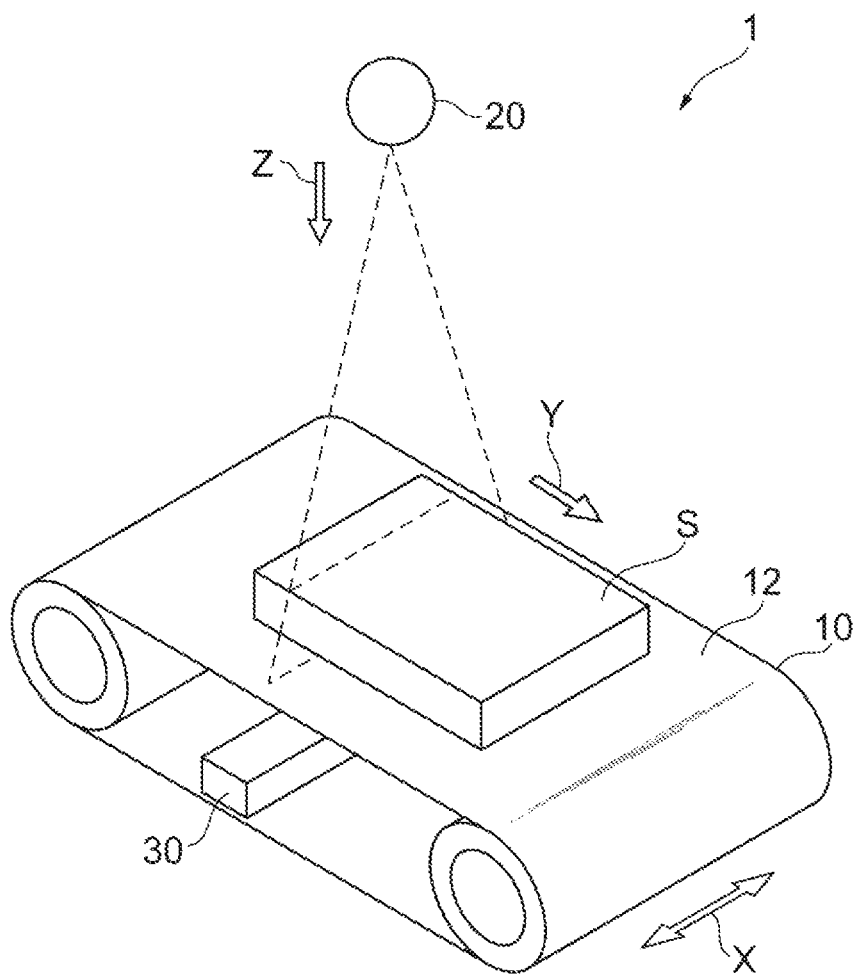
FIG. 1 is a perspective view of an X-ray foreign matter inspection device according to an embodiment.

Hereinafter, referring to drawings, embodiments of a radiation detection device, a radiation image acquisition device, and a radiation image acquisition method will be described in detail. Like reference numerals will be given to like or corresponding portions in the drawings.

Figure 2:
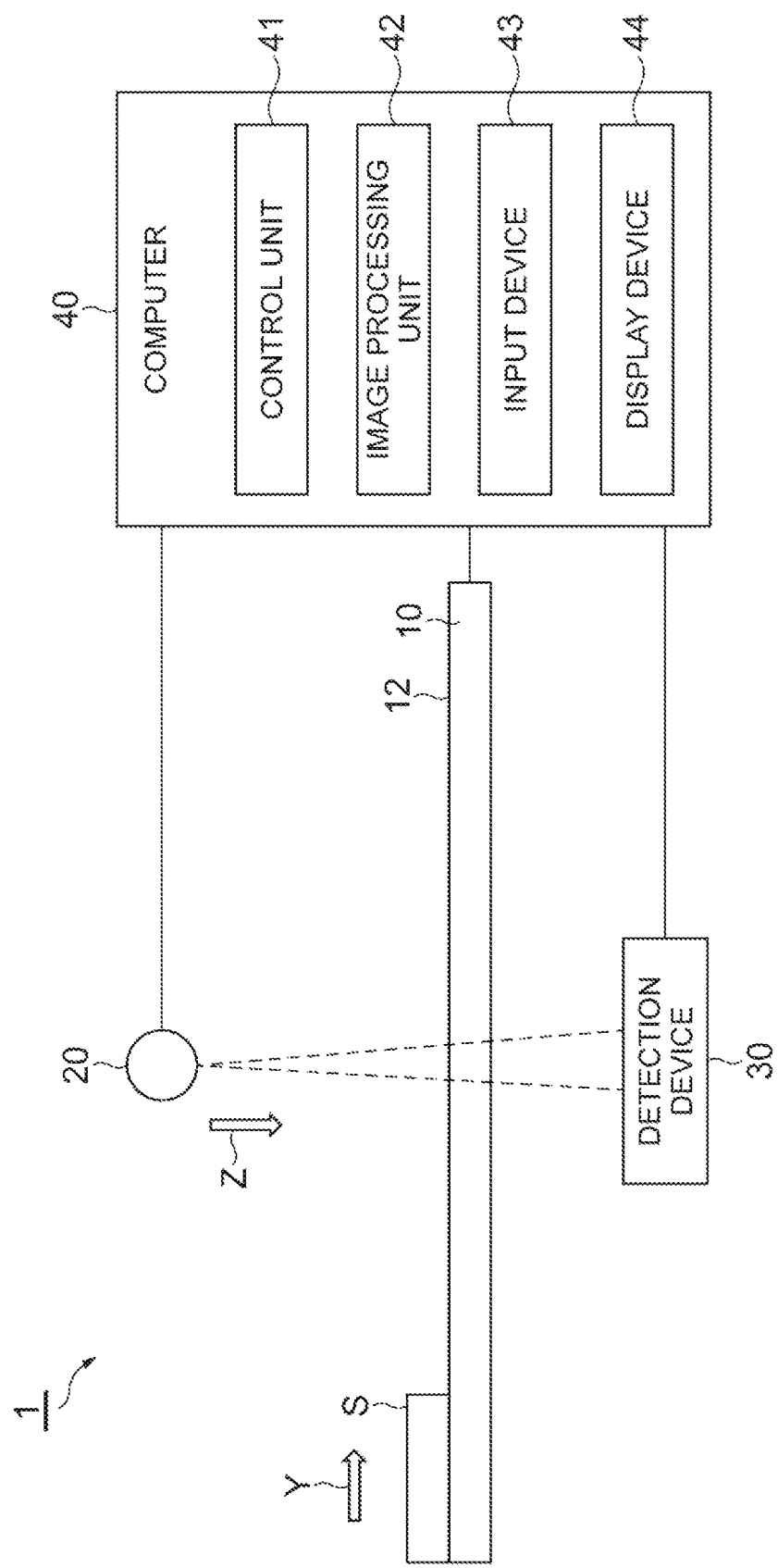
FIG. 2 is a schematic block diagram of the X-ray foreign matter inspection device illustrated in FIG. 1.

FIG. 1 is a perspective view of an X-ray foreign matter inspection device according to an embodiment, and FIG. 2 is a schematic block diagram of the X-ray foreign matter inspection device illustrated in FIG. 1. As illustrated in FIGS. 1 and 2, an X-ray foreign matter inspection device 1 is a radiation image acquisition device in which an X-ray (a radiation) is emitted from an X-ray source in an emitting direction Z to an inspection target object S, and in the X-ray emitted, a transmitted X-ray which is transmitted through the inspection target object S is detected in a plurality of energy ranges by an X-ray detection device 30. The X-ray foreign matter inspection device 1 executes an inspection for a foreign matter contained in the inspection target object S or a hand carriage baggage inspection by use of a transmitted X-ray image. The X-ray foreign matter inspection device 1 comprises a belt conveyor 10, an X-ray emitting device 20, the dual energy type X-ray detection device 30, and a computer 40.

As illustrated in FIG. 1, the belt conveyor 10 comprises a belt section 12 on which the inspection target object S is rested, and moves the belt section 12 in a conveyance direction Y to thereby convey the inspection target object S at a predetermined conveyance speed in the conveyance direction Y. The conveyance speed of the inspection target object S is any speed between 10 m/min and 90 m/min, for example. The inspection target object S conveyed by the belt conveyor 10 is, for example, food such as meat, a rubber product such as a tire, a hand carriage baggage or luggage for security check, a resin product, a metallic product, resource material such as a mineral, waste material for separation or resource recovery (recycling), or an electronic component.

The X-ray emitting device 20 is a device configured as an X-ray source for emitting an X-ray in the emitting direction Z to the inspection target object S. The X-ray emitting device 20 constitutes a point light source and is configured so that its tube voltage can be set between 30 and 80 kV and its tube current can be set between 0.4 and 3.3 mA, and its X-ray output can be in the range of 12 to 100 w. The X-ray emitting device 20 emits an X-ray while diffusing it at a predetermined angle range in a detection direction X perpendicular (intersecting) to the emitting direction Z and the conveyance direction Y. The X-ray emitting device 20 is disposed a predetermined distance away from the belt section 12 to be situated above the belt section 12 so that the emitting direction Z of an X-ray is directed towards the belt section 12 and a diffused X-ray covers the whole of the inspection target object S in its width direction (the detection direction X). In a length direction (the conveyance direction Y) of the inspection target object S, the X-ray emitting device 12 emits an X-ray to a predetermined divided range in the length direction as its emitting range, so that the X-ray is emitted to the whole of the inspection target object S in the length direction as a result of the inspection target object S being conveyed in the conveyance direction Y by the belt conveyor 10.

The X-ray detection device 30 is a dual energy type X-ray detection device configured to detect an X-ray transmitted through the inspection target object S in the X-ray emitted from the X-ray emitting device 20 in two regions of a low energy range and a high energy range. Although a detailed configuration and function of the X-ray detection device 30 will be described later, the X-ray detection device 30 detects a transmitted X-ray in the high and low energy ranges and generates image data of the individual energy ranges. The X-ray detection device 30 may amplify image data that it generates or may execute a predetermined correction process. The X-ray detection device 30 outputs the image data to the computer 40.

The computer 40 controls the conveyance by the belt conveyor 10 and the conveyance speed thereof, the emitting of an X-ray by the X-ray emitting device 20, the tube voltage and the tube current, and the detecting operation of an X-ray by the X-ray detection device 30. The computer 40 has a control unit 41 configured to be responsible for the controls described above, an image processing unit 42 configured to process the image data inputted from the X-ray detection device 30 to generate a subtraction image, an input device 43 configured to input X-ray detecting conditions, image processing conditions, and the like, and a display device 44 configured to display an acquired X-ray image (a radiation image). The computer 40 has an operation circuit configured to implement the individual functions and a memory configured to store information as a hardware configuration and is made up of, for example, a personal computer or a smart device such as a smartphone and a tablet terminal. The input device 43 is, for example, a touch panel, a mouse, or a keyboard, and the display device 44 is a display such as, for example, a touch panel, a liquid crystal display or an organic EL display.

Figure 3:
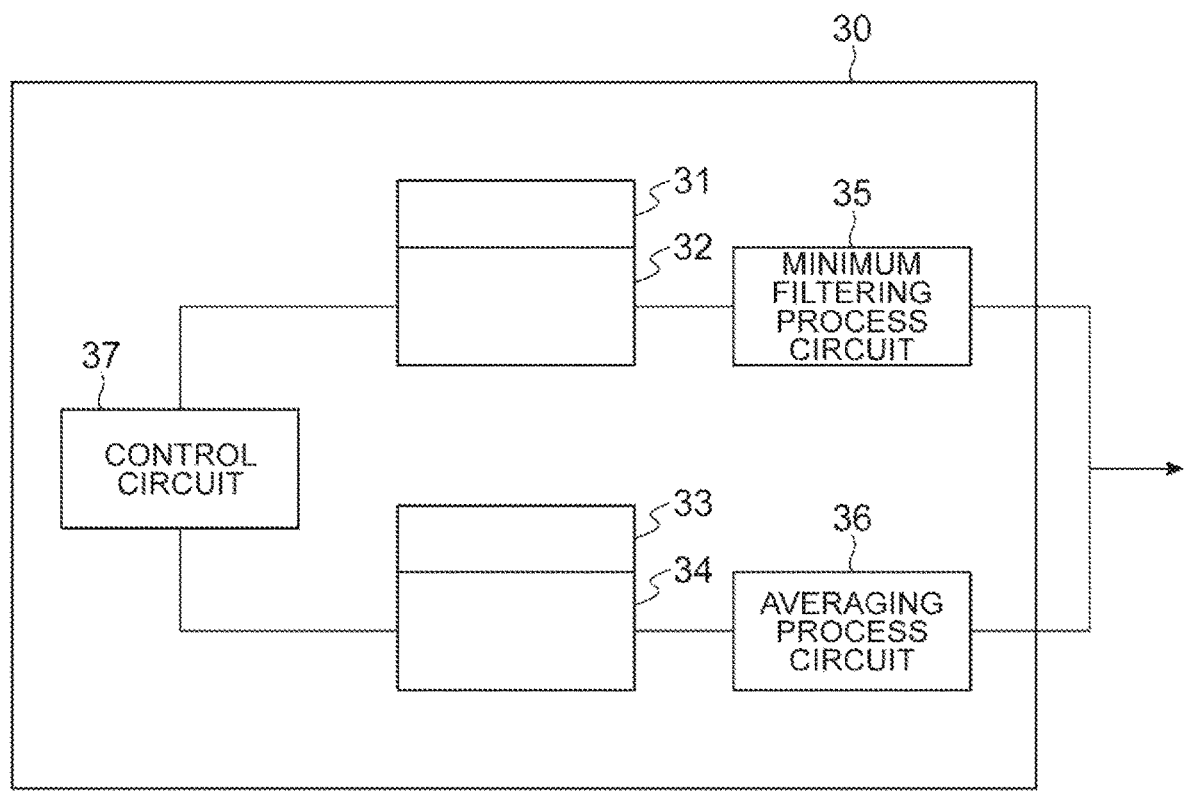

Next, referring to FIG. 3, the X-ray detection device 30 according to the embodiment will be described in detail. FIG. 3 is a schematic block diagram of the X-ray detection device used in the X-ray foreign matter inspection device illustrated in FIG. 2. As illustrated in FIG. 3, the X-ray detection device 30 comprises a low energy scintillator 31, a low energy line sensor 32, a high energy scintillator 33, a high energy line sensor 34, a minimum filtering process circuit 35, an averaging process circuit 36, and a control circuit 37. The X-ray detection device 30 is a so-called vertical dual energy type radiation line sensor camera in which the low energy line sensor 32 is disposed on the high energy line sensor 34. The control circuit 37 controls operations of the low energy line sensor 32, the high energy line sensor 34 and the like.

Figure 4:
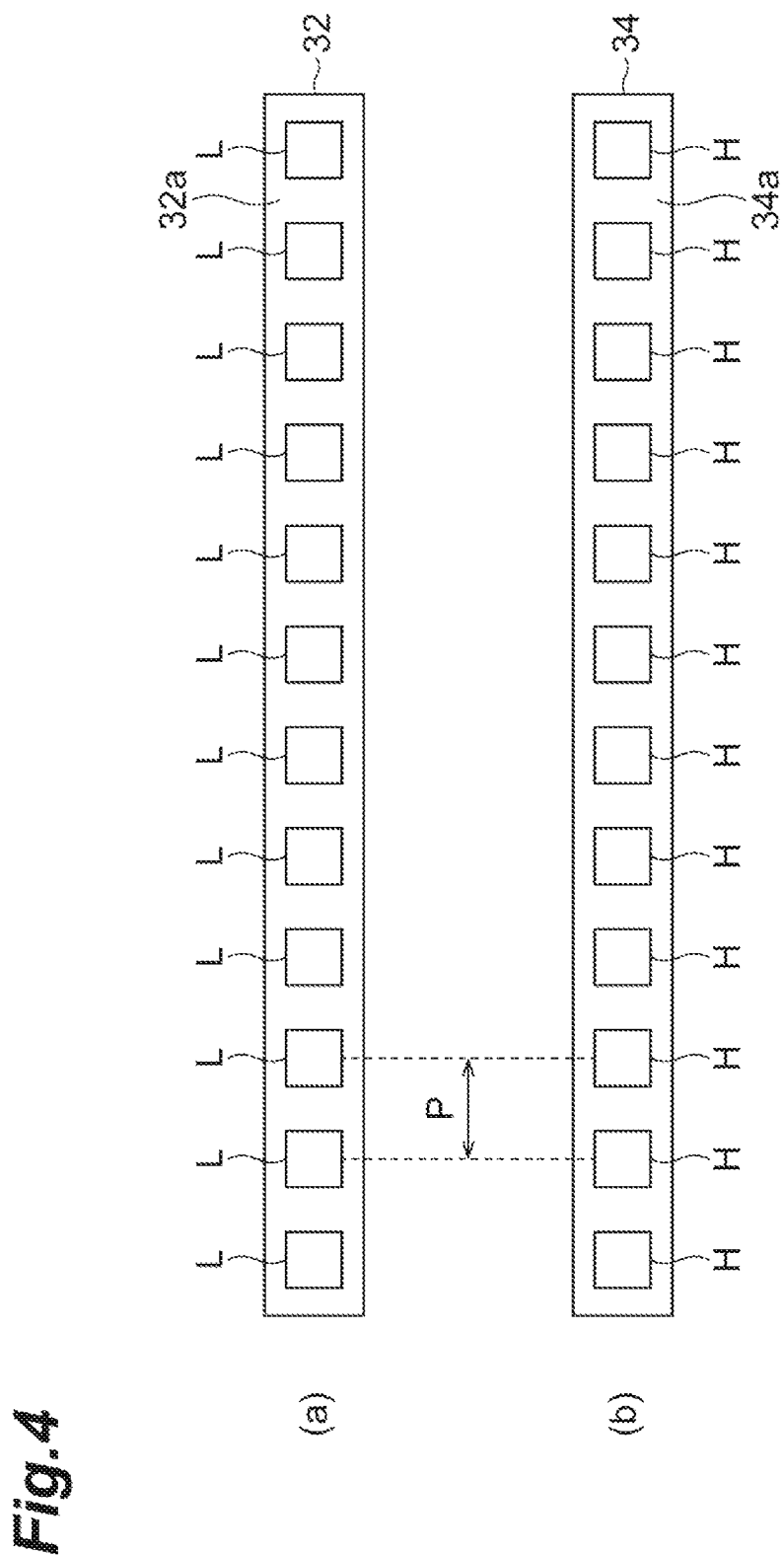
FIG. 4(a) is an example of pixels for detecting an X-ray of a low energy range in the X-ray detection device illustrated in FIG. 3.
FIG. 4(b) is an example of pixels for detecting an X-ray of a high energy range in the X-ray detection device illustrated in FIG. 3.

The low energy scintillator 31 is a member extending along the detection direction X (a direction perpendicular to a surface of a sheet of paper on which FIG. 3 is drawn) for detecting an image of the target object S and configured to convert an X-ray of a low energy range in an X-ray transmitted through the target object S into scintillation light and is bonded to a light receiving surface of the low energy line sensor 32. As illustrated in FIG. 4, the low energy line sensor 32 has a plurality of pixels L arranged along the detection direction X on a light receiving surface 32a and detects the scintillation light converted by the low energy scintillator 31 using these pixels L to acquire low energy image data. The number of pixels L is, for example, 1024 (part of the pixels is omitted in the drawing). In this way, the low energy line sensor 32 detects the X-ray of the low energy range.

The high energy scintillator 33 is a member extending along the detection direction X for detecting an image of the target object S and configured to convert an X-ray of a high energy range in the X-ray transmitted through the target object S into scintillation light and is bonded to a light receiving surface of the high energy line sensor 34. As illustrated in FIG. 4, the high energy line sensor 34 has a plurality of pixels H arranged along the detection direction X on a light receiving surface 34a and detects the scintillation light converted by the high energy scintillator 33 using these pixels H to acquire high energy image data. The number of pixels H is, for example, 1024 (part of the pixels is omitted in the drawing) as with the pixels L. In this way, the high energy line sensor 34 detects the X-ray of the high energy range. The high energy range detected by the high energy line sensor 34 is higher than the low energy range detected by the low energy line sensor 32; however, the high energy range detected by the high energy line sensor 34 and the low energy range detected by the low energy line sensor 32 are not clearly distinguished, and the energy ranges may overlap to some extent.

In the X-ray detection device 30, the number of pixels L of the low energy line sensor 32 is the same as the number of pixels H of the high energy line sensor 34, and the pixels L and the pixels H are arranged at the same pixel pitch P on the light receiving surfaces 32a, 34a, respectively. In this way, the image data outputted from the line sensor 32 is easily matched with the image data outputted from the line sensor 34 to clarify the corresponding relationship between them, and the control in executing the subtraction process or the like becomes easy, whereby the real time process is executed more easily.

Although the low energy scintillator 31 and the high energy scintillator 33 may be made of the same material, the low energy scintillator 31 and the high energy scintillator 33 may be made of different materials. Additionally, thicknesses of the low energy scintillator 31 and the high energy scintillator 33 may be the same or different.

Figure 5:
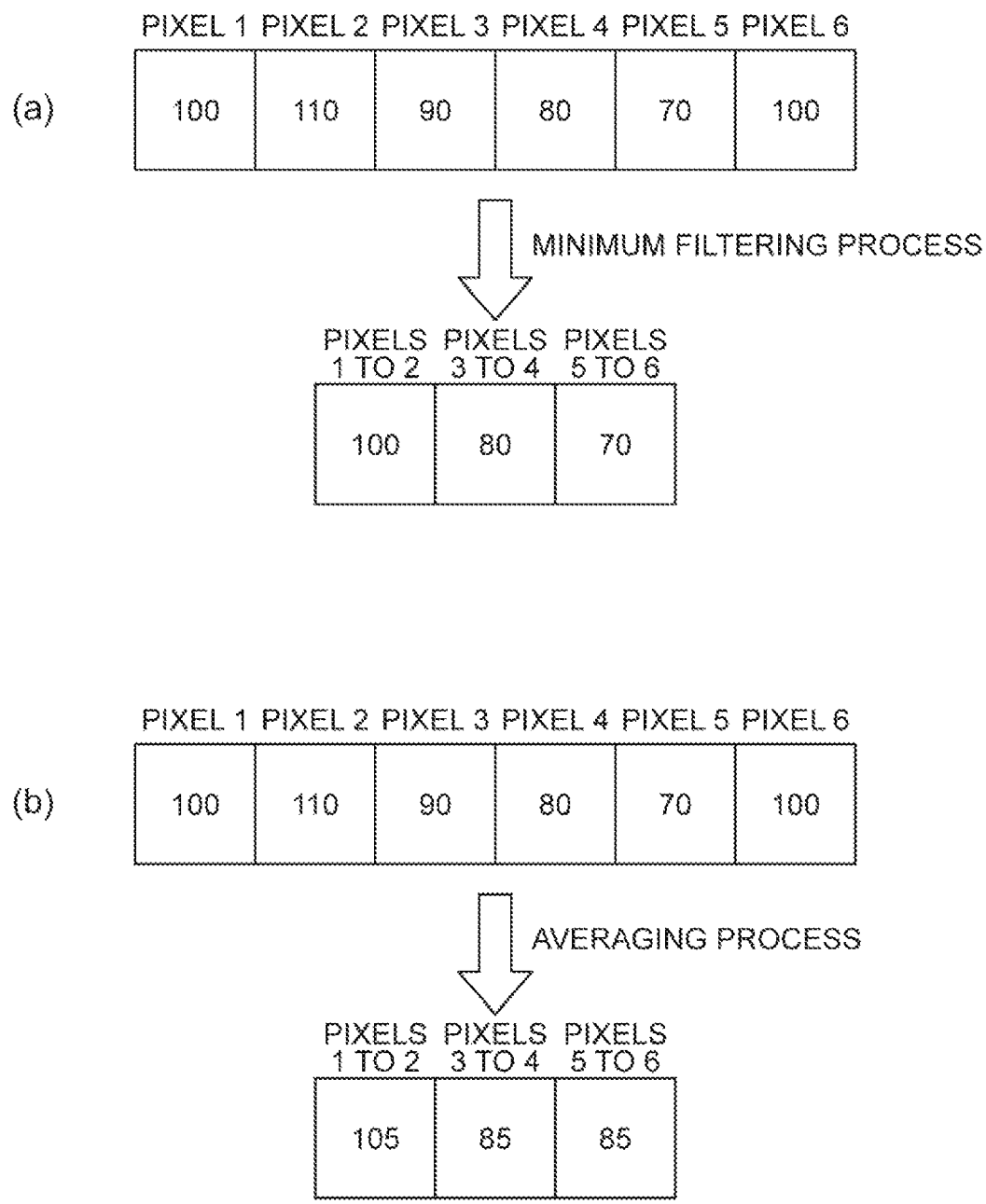
FIG. 5(a) is a diagram illustrating a summary of a minimum filtering process which is a thinning-out process executed in the X-ray detection device illustrated in FIG. 3.
FIG. 5(b) is a diagram illustrating a summary of an averaging process which is another thinning-out process by data executed in the X-ray detection device illustrated in FIG. 3.

When receiving image data outputted from the low energy line sensor 32, the minimum filtering process circuit 35 executes a first thinning-out process including a minimum filtering process on the received image data. For example, as illustrated in FIG. 5(*a*), when there are three sets of image data 100 and 110, 90 and 80, 70 and 100 which correspond to pixels 1 to 6, the minimum filtering process circuit 35 executes a thinning-out process in which the minimum filtering process circuit 35 leaves image data of a lower luminance of signals from adjacent pixels of each set and removes the other image data. Then, the minimum filtering process circuit 35 executes a process in which the minimum filtering process circuit 35 leaves a luminance of 100 as image data of pixels 1 to 2, a luminance of 80 as image data of pixels 3 to 4, and a luminance of 70 as image data of pixels 5 to 6. In this way, in the minimum filtering process circuit, the thinning-out process is executed in which the image data of the lower luminance of the signals from the adjacent pixels is left, and the remaining image data is removed. The minimum filtering process circuit 35 outputs converted image data (first converted image data) on which the thinning-out process is executed to the computer 40 as a detection signal.

When receiving image data outputted from the high energy line sensor 34, the averaging process circuit. 36 executes a second thinning-out process including an averaging process on the received image data. For example, as illustrated in FIG. 5(*b*), when there are three sets of image data 100 and 110, 90 and 80, 70 and 100 which correspond to pixels 1 to 6, the averaging process circuit 36 executes a thinning-out process in which an average value of luminances of signals from adjacent pixels of each set is calculated to reduce the quantity of data and executes a process in which the averaging process circuit 36 determines a luminance of 105 as image data of pixels 1 to 2, a luminance of 85 as image data of pixels 3 to 4, and a luminance of 85 as image data of pixels 5 to 6. In this way, in the averaging process circuit 36, the thinning-out process is executed in which the average value of the luminances of the signals from the adjacent pixels is calculated to reduce the quantity of data. The averaging process circuit 36 outputs converted image data on which the thinning-out process is executed to the computer 40 as a detection signal. The minimum filtering process circuit 35 and the averaging process circuit 36 make up the image processing unit configured to process an image.

In the image processing unit 42 of the computer 40, an operation process (a subtraction process) to obtain difference data between the low energy converted image data which is thinned out by the minimum filtering process circuit 35 and the high energy converted image data which is thinned out by the averaging process circuit 36 is executed to thereby generate a subtraction image, which is a synthetic image. Then, the computer 40 outputs and displays the subtraction image generated through the operation process on the display device 44. Foreign matters contained in the inspection target object S can be checked visually by outputting and displaying the subtraction image in that way. Only the data may be outputted without outputting and displaying the subtraction image, so that a detection process is executed on the image data to thereby detect directly foreign matters or the like contained in the inspection target object S from the image data. The real time process is achieved in this way.

Next, an X-ray image acquisition method will be described in which an X-ray transmitted through the inspection target object S conveyed in the conveyance direction Y is detected using the X-ray foreign matter inspection device 1.

In this acquisition method, firstly, an X-ray is emitted by the X-ray emitting device 20 to the inspection target object S which is conveyed by the belt conveyor 10. Then, in the X-ray emitted to and transmitted through the inspection target object S, an X-ray of a low energy range is converted into scintillation light by the low energy scintillator 31, and in the X-ray emitted to and transmitted through the inspection target object S, an X-ray of a high energy range is converted into scintillation light by the high energy scintillator 33.

Subsequently, the scintillation light from the low energy scintillator 31 is detected by the plurality of pixels L of the low energy line sensor 32, and low energy image data is outputted to the minimum filtering process circuit 35. Additionally, the scintillation light from the high energy scintillator 33 is detected by the plurality of pixels H of the high energy line sensor 34, and low energy image data is outputted to the averaging process circuit 36. In the minimum filtering process circuit 35, the first thinning-out process, which is the minimum filtering process, is executed on the inputted low energy image data (refer to FIG. 5(*a*)), a first converted image is outputted to the computer 40, while in the averaging process circuit 36, the second thinning-out process, which is the averaging process, is executed on the inputted high energy image data (refer to FIG. 5(*b*)), and a second converted image is outputted to the computer 40. Then, in the computer 40, a subtraction image (a radiation image) is generated based on the subtraction method by using those converted images.

Thus, in the X-ray foreign matter inspection device 1 comprising the X-ray detection device 30 according to the embodiment, the first thinning-out process including the minimum filtering process is executed on the image data outputted from the low energy line sensor 32 configured to detect an X-ray of a low energy range, while the second thinning-out process including the averaging process is executed on the image data outputted from the high energy line sensor 34 configured to detect an X-ray of a high energy range. Due to this, the minimum filtering process is executed on the image from the low energy line sensor 32 configured to acquire an X-ray image of a low energy range in which a difference in luminance between the foreign matter and the background is relatively great not only to reduce the number of pixels to a half but also to leave the data of a low luminance, whereby information on the foreign matter can be left in the image data after the thinning-out process. On the other hand, the averaging process is executed on the image from the high energy line sensor 34 configured to acquire an X-ray image of a high energy range in which the difference in luminance between the foreign matter and the background is relatively small not only to reduce noise (improve S/N) but also to reduce the number of pixels to a half while preventing information on the foreign matter from being removed from the image data after the thinning-out process. Thus, according to the X-ray foreign matter inspection device 1, the real time process can be achieved by lowering the resolution of the X-ray image acquired while leaving the information on the foreign matter.

In the X-ray detection device 30 according to the embodiment, the high energy scintillator 33 is disposed so as to convert the X-ray transmitted through the low energy scintillator 31 into low energy scintillation light. Due to this, since the scintillators 31, 33 are disposed sequentially relative to the incident direction of the X-ray (are disposed, for example, so as to be superposed on each other vertically), the same position on the target object S can be imaged without delay controlling the detection timings of X-ray by both the scintillators 31, 33.

Figure 6:
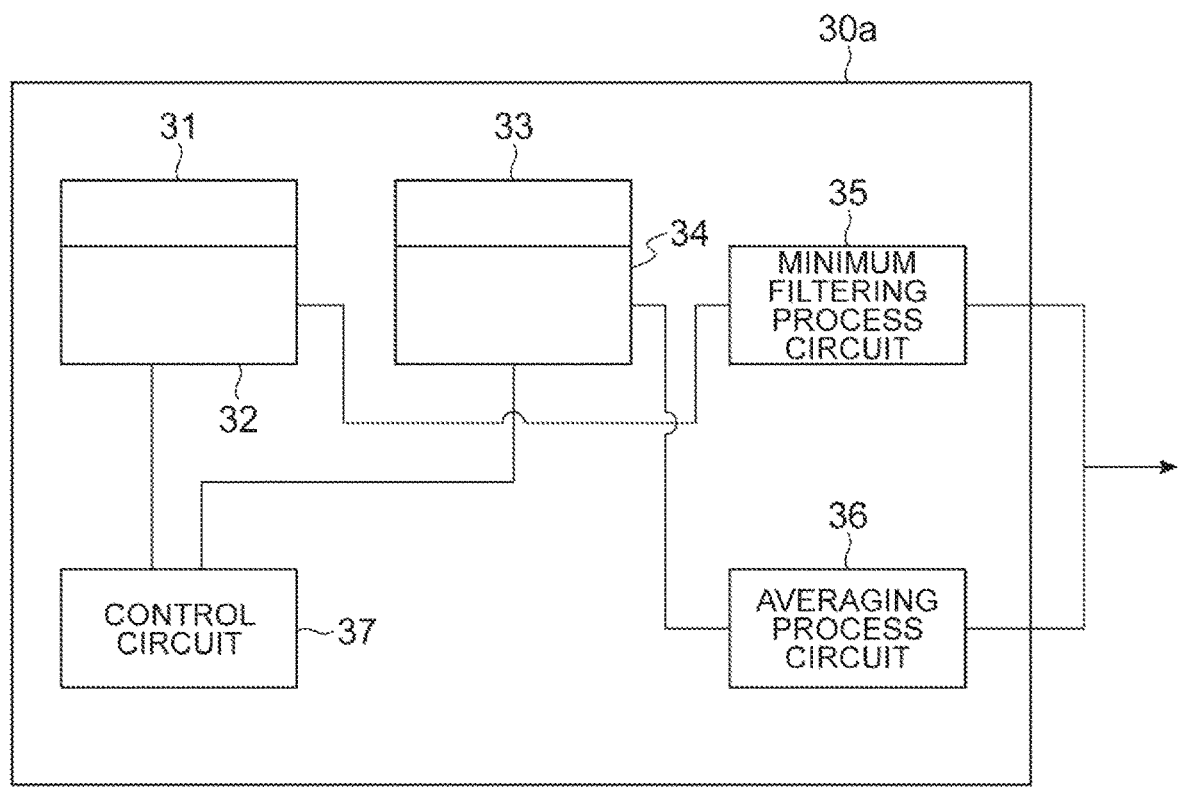
FIG. 6 is a schematic block diagram illustrating schematically a modified example of the X-ray detection device according to the embodiment.

Thus, while the preferred embodiment has been described heretofore, the present invention is not limited to the embodiment and hence can be modified variously. For example, while the embodiment is described as being applied to the so-called vertical dual energy type X-ray detection device, the present invention is not limited thereto. For example, as illustrated in FIG. 6, the present invention may be applied to a so-called horizontal dual energy type X-ray detection device 30*a* in which a low energy scintillator 31 and a low energy line sensor 32 and a high energy scintillator 33 and a high energy line sensor 34 are disposed parallel to each other with a predetermined area defined between them. Thinning-out processes (a minimum filtering process and an averaging process) which are to be executed on low energy image data and high energy image data of the X-ray detection device 30*a* are the same as those described above. However, in this X-ray detection device 30*a*, since distances between the line sensors 32, 34 which are arranged parallel to each other and an X-ray emitting device 20 configured to radiate an X-ray to an inspection target object S become the same, the same position on the target object S can be imaged without executing a control taking a magnification rate of the X-ray from the X-ray emitting device 20 into consideration. In this horizontal dual energy type X-ray detection device 30*a*, the low energy line sensor 32 and the high energy line sensor 34 may be formed on the same substrate. As this occurs, a row of pixels L of the low energy line sensor and a row of pixels H of the high energy line sensor can more easily be formed parallel to each other with a non-sensitive area (the predetermined area) defined between them.

In the embodiment, while the minimum filtering process circuit 35 and the averaging process circuit 36 which thin out the low energy image data and the high energy image data, respectively, are described as being provided within the X-ray detection device 30, the minimum filtering process by the minimum filtering process circuit 35 and the averaging process by the averaging process circuit 36 may be executed by the image processing unit 42 of the computer 40. As this occurs, a low energy detection signal from the line sensor 32 and a high energy detection signal from the line sensor 34 are inputted into the computer 40, whereby such thinning-out processes as a minimum filtering process and an averaging process are executed by the computer 40. In this case, part of the image processing unit 42 which executes those image processing processes can make up part the radiation detection device.

In the embodiment, while the thinning-out process is executed by averaging the detection signal from the high energy line sensor 34 using the averaging process circuit 36, in place of this averaging process, an adding process may be executed on the detection signal from the high energy line sensor 34. In this case, too, the information on the foreign matter is prevented from being removed from the image data after the thinning-out process, and noise can also be reduced (S/N can also be improved). When referred to herein, the "adding process" is a thinning-out process in which luminances of signals from adjacent pixels are added together to thereby reduce the quantity of data and is a process which is substantially similar to the averaging process described above.

In the embodiment, while the minimum filtering process circuit 35 configured to thin out the detection signal from the low energy line sensor 32 and the averaging process circuit 36 configured to execute the averaging process on the detection signal from the high energy line sensor 34 are described as being arranged parallel to each other, a configuration may be adopted in which one image processing unit is provided into which a detection signal from the low energy line sensor 32 and a detection signal from the high energy line sensor 34 are inputted successively, in this image processing unit, image data is counted, and firstly, a thinning-out process (for example, a minimum filtering process) is executed on a detection signal of a predetermined number of pixels (for example, first 1024 pixels), and when the process is completed, a thinning-out process (for example, an averaging process or an adding process) is executed on a detection signal of the next predetermined number of pixels (for example, the next 1024 pixels). A switching operation like this may be executed by the image processing unit 42 of the computer 40.

INDUSTRIAL APPLICABILITY

The embodiment can be applied, for example, to a dual energy type radiation detection device, a radiation image acquisition device comprising the radiation detection device, and a radiation image acquisition method.

REFERENCE SINGS LIST

1 . . . X-ray foreign matter inspection device; 10 . . . belt conveyor; 20 . . . X-ray emitting device; 30, 30a . . . X-ray detection device; 31 . . . low energy scintillator; 32 . . . low energy line sensor; 33 . . . high energy scintillator; 34 . . . high energy line sensor; 35 . . . minimum filtering process circuit; 36 . . . averaging process circuit; 40 . . . computer; 42 . . . image processing unit; L, H . . . pixel; P . . . pixel pitch; S . . . inspection target object.

The invention claimed is:

1. A radiation detection device for detecting x-ray radiation transmitted through a target object conveyed in a conveyance direction, the radiation detection device comprising:
   a first scintillator configured to convert x-ray radiation of a low energy range in the x-ray radiation transmitted through the target object into first scintillation light;
   a first line sensor having a plurality of first pixels arranged along a detection direction intersecting the conveyance direction, the first line sensor configured to detect the first scintillation light with the first pixels to output first image data;
   a second scintillator configured to convert x-ray radiation of a high energy range in the x-ray radiation transmitted through the target object into second scintillation light, the high energy range being higher than the low energy range;
   a second line sensor having a plurality of second pixels arranged along the detection direction intersecting the conveyance direction, the second line sensor configured to detect the second scintillation light with the second pixels to output second image data, wherein the first pixels of the first line sensor and the second pixels of the second line sensor are identical to each other in number and are arranged at an identical pixel pitch; and
   an image processing unit including:
      a minimum filtering process circuit configure to execute a first thinning-out process including a minimum filtering process on the first image data outputted from the first line sensor, in which the image data of the lower luminance of the signals from adjacent pixels is left, and the remaining image data is removed; and
      an averaging process circuit configured to execute a second thinning-out process including an averaging process or an adding process on the second image data outputted from the second line sensor, in which an average value of luminances of the signals from adjacent pixels is calculated or luminances of signals from adjacent pixels are added together to reduce the quantity of data.

2. The radiation detection device according to claim 1, further comprising an image processing unit configured to execute a first thinning-out process including a minimum filtering process on the first image data outputted from the first line sensor and to execute a second thinning-out process including an averaging process or an adding process on the second image data outputted from the second line sensor.

3. The radiation detection device according to claim 2, wherein the image processing unit can switch between the first thinning-out process including the minimum filtering process and the second thinning-out process including the averaging process or the adding process.

4. The radiation detection device according to claim 1, wherein the second scintillator is disposed to convert x-ray radiation transmitted through the first scintillator into the second scintillation light.

5. The radiation detection device according to claim 1, wherein the first and second line sensors are disposed parallel to each other with a predetermined area defined between the first and second line sensors.

6. A radiation image acquisition device, comprising:
   the radiation detection device according to claim 1;
   an x-ray radiation source configured to emit x-ray radiation to the target object;
   a conveyance unit configured to convey the target object in the conveyance direction; and
   an image forming device configured to form an x-ray radiation image based on first converted image data on which the minimum filtering process is executed and second converted image data on which the averaging process or the adding process is executed.

7. A radiation image acquisition method for detecting x-ray radiation transmitted through a target object conveyed in a conveyance direction using a radiation detection device comprising a first scintillator, a second scintillator, a first line sensor having a plurality of first pixels arranged along a detection direction, a second line sensor having a plurality of second pixels arranged along the detection direction, and an image processing unit, wherein the first pixels and the second pixels are identical to each other in number and are arranged at an identical pixel pitch, the radiation image acquisition method comprising:
   a first conversion step of converting x-ray radiation of a low energy range in the x-ray radiation transmitted through the target object into a first scintillation light by the first scintillator;

a first detection step of detecting the first scintillation light with the first pixels of the first line sensor to output first image data;

a second conversion step of converting x-ray radiation of a high energy range in the x-ray radiation transmitted through the target object into a second scintillation light by the second scintillator, the high energy range being higher than the low energy range;

a second detection step of detecting the second scintillation light with the second pixels of the second line sensor to output second image data;

a first image processing step of executing a first thinning-out process on the first image data using the image processing unit to output a first converted image, in which the image data of the lower luminance of the signals from adjacent pixels is left, and the remaining image data is removed, the first thinning-out process being a minimum filtering process; and a second image processing step of executing a second thinning-out process on the second image data using the image processing unit to output a second converted image, in which an average value of luminances of the signals from adjacent pixels is calculated or luminances of signals from adjacent pixels are added together to reduce the quantity of data, the second thinning-out process being an averaging process or an adding process.

8. The radiation image acquisition method according to claim 7, wherein in the second conversion step, the x-ray radiation transmitted through the first scintillator is converted into the second scintillation light by the second scintillator.

9. The radiation image acquisition method according to claim 7, wherein the first and second detection steps are executed by the first and second line sensors arranged parallel to each other with a predetermined area defined between the first and second line sensors.

10. The radiation image acquisition method according to claim 7, further comprising:

an emitting step of emitting x-ray radiation to the target object;

a conveyance step of moving the target object along a conveyance direction; and a generation step of generating an x-ray radiation image based on the first converted image and the second converted image.

\* \* \* \* \*